United States Patent [19]

Kawasaki

[11] Patent Number: 4,661,692

[45] Date of Patent: Apr. 28, 1987

[54] MICROSCOPE PROVIDED WITH AUTOMATIC FOCUSING DEVICE HAVING MEMORY MEANS

[75] Inventor: Masami Kawasaki, Hachiouji, Japan

[73] Assignee: Olympus Optical Co., Ltd., Tokyo, Japan

[21] Appl. No.: 593,311

[22] Filed: Mar. 26, 1984

[30] Foreign Application Priority Data

Mar. 29, 1983 [JP] Japan .................... 58-53169
Mar. 29, 1983 [JP] Japan .................... 58-53170

[51] Int. Cl.$^4$ ............................................. G01J 1/20
[52] U.S. Cl. ................................. 250/201; 250/205
[58] Field of Search ............... 250/201, 204, 237 R, 250/216, 205; 354/404, 405, 406, 407; 364/167; 356/1, 4; 350/507, 518, 520

[56] References Cited

U.S. PATENT DOCUMENTS 3,798,449 3/1974 Reinheimer et al. ............... 250/201
3,833,282 9/1974 Kappl et al. ........................ 350/87

Primary Examiner—David C. Nelms
Attorney, Agent, or Firm—Cushman, Darby & Cushman

[57] ABSTRACT

A microscope provided with a photographing device which has a structure for always projecting an optimum image onto an image pickup device, a structure for correcting image data obtained from the image pickup device to eliminate the influences of the unevenness of the brightness distribution of the projected image and the unevenness of the characteristics of each picture element forming the image pickup device, a structure for bringing a focusing stage to an in-focus position adapted to an objective selected to be used on the basis of the corrected image data and a structure for making an out-focus indication when the focusing stage is brought to a predetermined upper limit position or lower limit position, to make high precision, quick automatic focusing possible.

13 Claims, 35 Drawing Figures

| REVOLVER POSITION | | 1 | 2 | 3 | 4 | 5 | 6 |
|---|---|---|---|---|---|---|---|
| OBJECTIVE | MAGNIFI-CATION | a | b | c | d | e | f |
| | KIND | A | B | C | D | E | F |

FIG. 6

| MAGNIFICATION KIND | OBJECTIVE NA VALUE | | | CONDENSER LENS | |
|---|---|---|---|---|---|
| | SPLAN APO | SPLAN | DPLAN | FOCAL DISTANCE | FS PROJECTION MAGNIFICATION |
| 1 x | — | 0.04 | — | 61.5 | 0.68 |
| 2 x | — | 0.08 | — | | |
| 4 x | 0.16 | 0.13 | 0.10 | | |
| 10 x | 0.40 | 0.30 | 0.25 | 12 | 0.133 |
| 20 x | 0.70 | 0.46 | 0.40 | | |
| 40 x | 0.95 | 0.70 | 0.65 | 6.5 | 0.0722 |
| 100 x | 1.40 | 1.25 | 1.25 | | |

FIG. 7

| LIGHT PATH | F No. (VISUAL FIELD NUMBER) |
|---|---|
| Bi | 28 |
| FK 2.5 x | 24 |
| 3.3 x | 18 |
| 4 x | 15 |
| 5 x | 12.3 |

FIG. 10

| LIGHT AMOUNT RATIO | ND 0 (1/2 FILTER) | ND 1 (1/4 FILTER) | ND 2 (1/8 FILTER) | ND 3 (1/16 FILTER) |
|---|---|---|---|---|
| 1 | | | | |
| 1/2 | ○ | | | |
| 1/4 | | ○ | | |
| 1/8 | ○ | ○ | | |
| 1/16 | ○ | | ○ | |
| 1/32 | ○ | | | ○ |
| 1/64 | ○ | ○ | ○ | |
| 1/128 | ○ | ○ | | ○ |
| 1/256 | ○ | | ○ | ○ |
| 1/512 | | ○ | ○ | ○ |
| 1/1024 | ○ | ○ | ○ | ○ |

○ : INSERTED

FIG. 11

| LIGHT PATH | Bi | $\log_a Bi$ |
|---|---|---|
| Bi 100 % | 1 | 0 |
| Bi 20 % | 0.2 | −9 |
| FK 2.5 x | 0.148 | −11 |
| 3.3 x | 0.0847 | −14 |
| 4 x | 0.0589 | −16 |
| 5 x | 0.0371 | −19 |

FIG. 12

| MAGNIFICATION | $\log_a Ob$ | | |
|---|---|---|---|
| | SPLAN APO | SPLAN | DPLAN |
| 1 x | — | 3 | — |
| 2 | — | 3 | — |
| 4 | 2 | 0 | −2 |
| 10 | 2 | 0 | −3 |
| 20 | −1 | −4 | −6 |
| 40 | −5 | −7 | −8 |
| 100 | −15 | −15 | −15 |

FIG. 13

| ND | $\log_a$ ND | | |
|---|---|---|---|
| 1 | $\geq \log_a$ ND | | $> -2$ |
| 1/2 | $-2 \geq$ | ⁄ | $> -6$ |
| 1/4 | $-6 \geq$ | ⁄ | $> -10$ |
| 1/8 | $-10 \geq$ | ⁄ | $> -14$ |
| 1/16 | $-14 \geq$ | ⁄ | $> -18$ |
| 1/32 | $-18 \geq$ | ⁄ | $> -22$ |
| 1/64 | $-22 \geq$ | ⁄ | $> -26$ |
| 1/128 | $-26 \geq$ | ⁄ | $> -30$ |
| 1/256 | $-30 \geq$ | ⁄ | $> -34$ |
| 1/512 | $-34 \geq$ | ⁄ | $> -38$ |
| 1/1024 | $-38 \geq$ | ⁄ | |

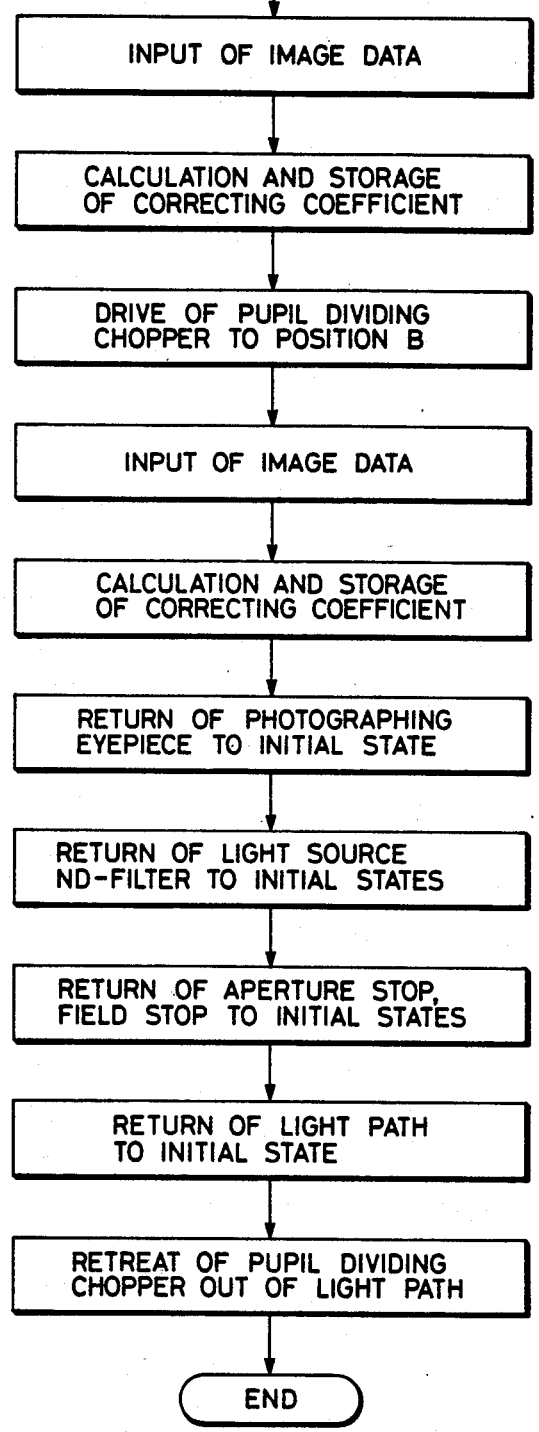

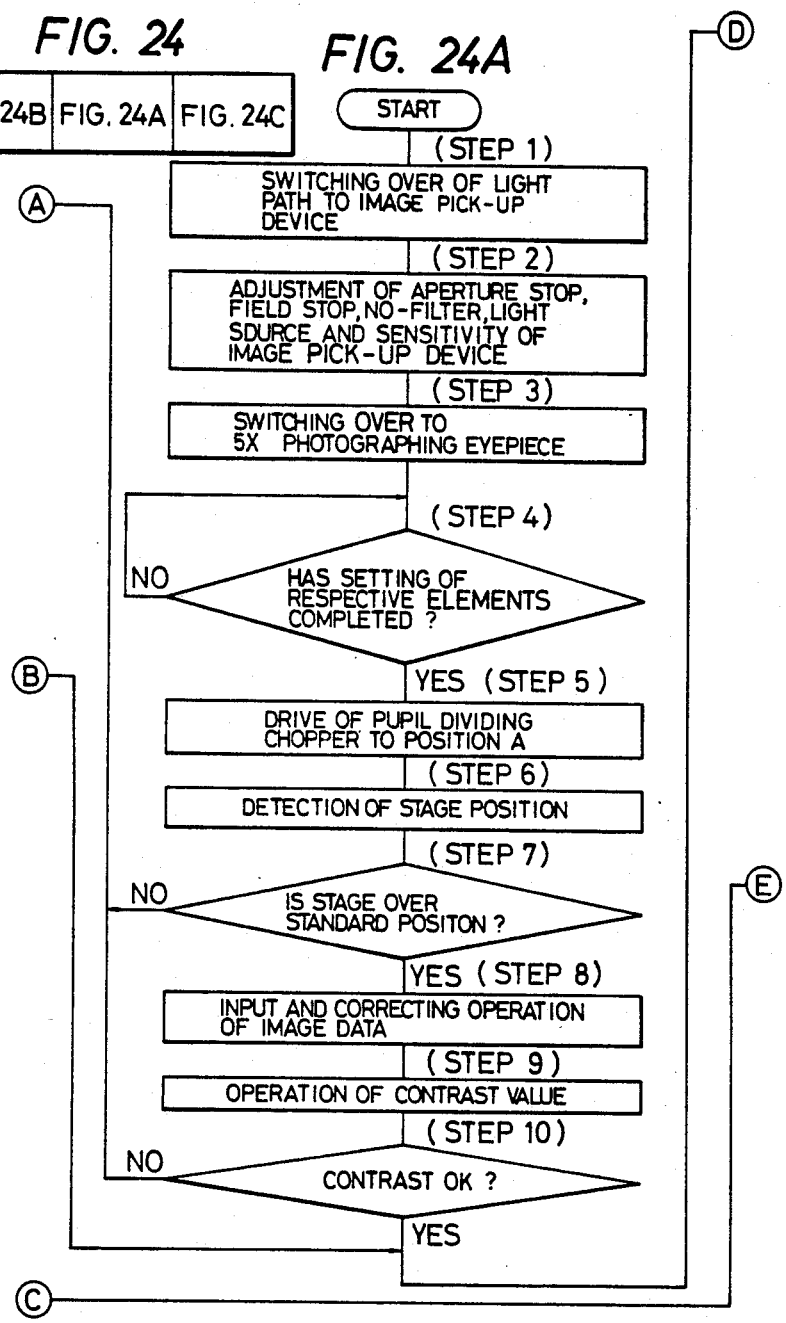

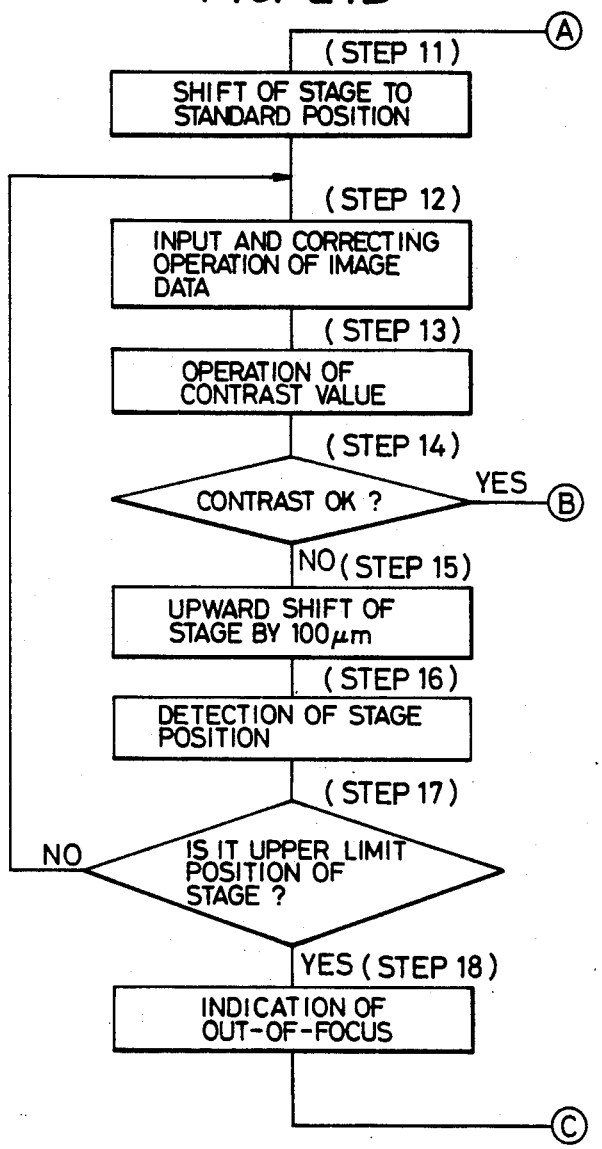

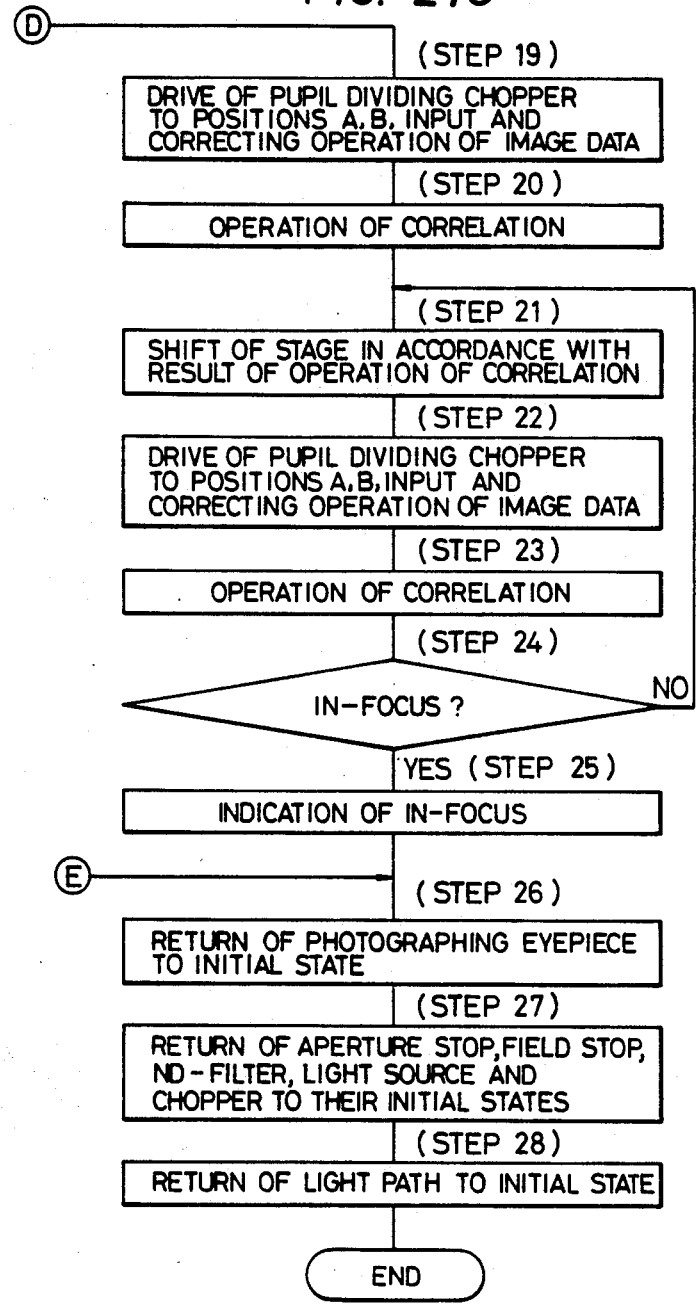

MICROSCOPE PROVIDED WITH AUTOMATIC FOCUSING DEVICE HAVING MEMORY MEANS

BACKGROUND OF THE INVENTION (a) Field of the invention:

This invention relates to microscopes and, more particularly, to a microscope provided with an automatic focusing device.

(b) Description of the prior art:

As automatic focusing devices for microscopes, a system wherein focusing is made by measuring the distance between an objective and a sample surface with a laser light or the like. Another system wherein focusing is made by measuring the distance by pressure variation of air jetted toward the sample surface from the tip portion of the objective. However, in these systems, there are defects which exist. Particularly in the case of a microscope for living objects, the in-focus position will be shifted, for example, by the change or the like of the thickness of the cover glass. Therefore, accurate focusing will be difficult and a change from the difference of the focus of the objective will be also a problem.

Therefore, a microscope of a system wherein an image pickup device is used to attempt to overcome these problems. However, in using this system, focusing will be possible only when the conditions are set by a complicated microscope operation and then the conditions required for the image pickup device are met. Therefore, it has been difficult to use as an automatic focusing system. That is to say, there is a problem that, in the image pickup device, due to its characteristics, the amount of the light projected as an optical image and the sensitivity (electric charge accumulating time) of the image pickup device itself must be properly set. The amount of the light projected onto the image pickup device varies with the amount of the light from the light source, numerical aperture (NA value) of the objective to be used, state of the sample, switchover of the ND filter and stop value of the aperture stop. Therefore, a method wherein, in order to control the electric charge accumulating time and the like of the image pickup device, the image signal is fed back to the driving circuit of the image pickup device and is again obtained has been proposed. However, this method has defects that the number of times of the data input is high, the processing time is long, the dynamic range of the image pickup device can not be well used and the S/N ratio of the image signal varies with the amount of the incident light.

When photographing by using an objective of a low magnification, the depth of field on the sample side will be so deep that, if focusing is made by observing through an eyepiece, wherever the focal point may be, it will be observed as if in-focused by the adjusting action of the eye but, on the other hand, the focal depth will be so shallow on the image side that, on the film surface, no good focusing will be able to be made.

SUMMARY OF THE INVENTION

A primary object of the present invention is to provide a microscope provided with an automatic focusing device of a system using an image pickup device wherein, in both observation and photographing, automatic focusing can be made quickly at a high precision by a simple operation.

This primary object is attained by providing an input means capable of putting in data relating to the magnifications and kinds of objectives, a memorizing means capable of memorizing the above mentioned data of a plurality of objectives put in by the data input means, drive controlling means capable of controlling the adjustment of light, adjustment of a field stop, adjustment of an aperture stop, switching over of a condenser lens, movement of a focusing stage, switching over of a light path and switching over of a photographing eyepiece, with electric signals while referring to the data read out of the memorizing means relating to an objective selected to use so that optimum focusing can be made in accordance with the objective selected to be used, an image pickup device arranged so as to be able to receive an image formed by the objective selected for focusing, a central processing unit for controlling the drive controlling means by receiving output data from the image pickup device and a photographing device capable of photographing the image formed through a photographing eyepiece. Thereby, the focusing operation can be made easy and operation mistakes can be prevented.

According to a preferred formation of the present invention, there is provided a correcting means for correcting image data from the image pickup device so as not to be influenced by the unevenness of the brightness of each part of the projected image and the irregularity of the characteristics of each picture element forming the image pickup device. Thereby, the in-focus precision can be further improved.

According to another preferred formation of the present invention, in obtaining correcting data for correcting image data and also in automatic focusing, the brightness of the light from the light source, field stop, aperture stop and magnification of the photographing eyepiece will be automatically set so that the image to be projected onto the image pickup device may be in a state optimum for the image pickup device in response to the objective selected to be used and, after the focusing stage is brought to the in-focus position, the brightness of the light from the light source, field stop, aperture stop and magnification of the photographing eyepiece will respectively automatically return to the states as of before they are determined to be optimum for observation or photographing. Thereby, the observation and photographing of the projected image optimum to the objective selected to be used can be always realized by a simple operation.

According to a further preferred formation of the present invention, a standard position of the focusing stage is provided in the position lower than a theoretical in-focus position for automatic focusing so that, when the focusing stage is below the standard position, after the focusing stage is brought to the standard position and when the focusing stage is above the standard position, in that position, the projected image data for focusing will be put in. In such case, when the focusing stage is in a predetermined upper limit position or lower limit position, an out-focus indication will be made. Therefore, the time for focusing can be greatly reduced and particularly, in the case of using an objective of a high magnification, it will be effective. Further, even in the case of using any kind of objective, the operation can be made safely and positively without breaking the slide glass or making the tip part of the objective collide with the focusing stage. In case of a microscope wherein the focusing stage is provided above the objective, the standard position of the stage is provided in the position higher than the theoretical in-focus position. Accordingly, when the focusing stage is above the standard position, after the focusing stage is brought to the standard position and when the focusing stage is below the standard position, in that position, the projected image data for focusing will be put in.

According to a still further preferred formation of the present invention, there is adopted a method wherein, in the process of operating the image data obtained from the image pickup device for automatic focusing, the contrast value of the projected image data is judged and a correlative operation is carried out. This makes it possible to reduce the time for processing the data.

This and other objects of the present invention will become more apparent during the course of the following detailed description and appended claims.

BRIEF DESCRIPTION OF THE DRAWINGS

FIG. 6 is a table showing combinations of objectives and condenser lenses;

FIG. 7 is a table showing FNos. (visual field numbers) of light paths;

FIG. 10 is a table showing light amount ratios by combinations of ND-filters;

FIG. 11 is a table showing light amount ratios by light paths;

FIG. 12 is a table showing light amount ratios by objectives;

FIG. 13 is a table showing light amount ratios by ND-filters;

FIGS. 22, 22A and 22B illustrate a flow chart showing a background data input process for automatic focusing;

FIGS. 24, 24A, 24B and 24C illustrates a flow chart showing the operation process for automatic focusing.

DESCRIPTION OF THE PREFERRED EMBODIMENTS

Figure 1:
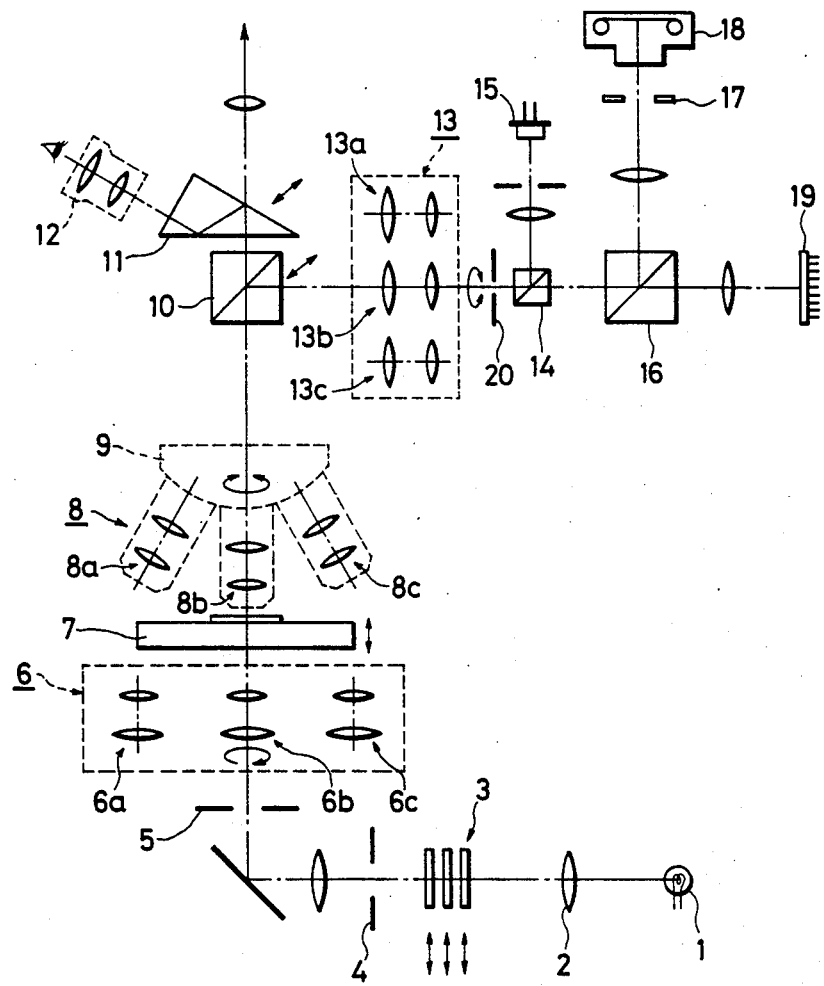
FIG. 1 is a schematic view showing an example of a basic formation of an optical system of a microscope.

The outline of the present invention shall be explained in the following with reference to the drawings. In FIG. 1 showing an optical system of a microscope to which the present invention is applied, the reference numeral 1 denotes a light source such as, for example, a halogen lamp, 2 denotes a collector lens, 3 denotes an ND-filter unit consisting of a plurality of ND-filters for adjusting the light without changing the color temperature of the light source, 4 denotes a field stop, 5 denotes an aperture stop, 6 denotes a condenser lens unit consisting of a plurality of condenser lenses 6a, 6b and 6c which can be selectively inserted into the light path, 7 denotes a focusing stage, 8 denotes an objective unit consisting of objectives 8a, 8b and 8c attached to a revolver 9, 10 and 11 denote beam splitters removably arranged in the light path to switch the light path to an observing system or a photographing system, 12 denotes an eyepiece optical system, 13 denotes a photographing eyepiece unit consisting of a plurality of photographing eyepieces 13a, 13b and 13c which can be selectively inserted into the light path, 14 denotes a beam splitter for leading the light at a predetermined rate to a light receiving element 15 for measuring the light through an image forming lens and a slit for removing such detrimental light as a flare in order to take a photograph, 16 denotes a beam splitter for leading the light to the film surface of a camera 18 through the image forming lens and a shutter 17 for the camera and to an image pickup device 19 for detecting focusing through another image forming lens, and 20 denotes a light bundle dividing chopper for automatic focusing. The image pickup device 19 for detecting focusing is formed by providing many picture elements in parallel.

Figure 2:
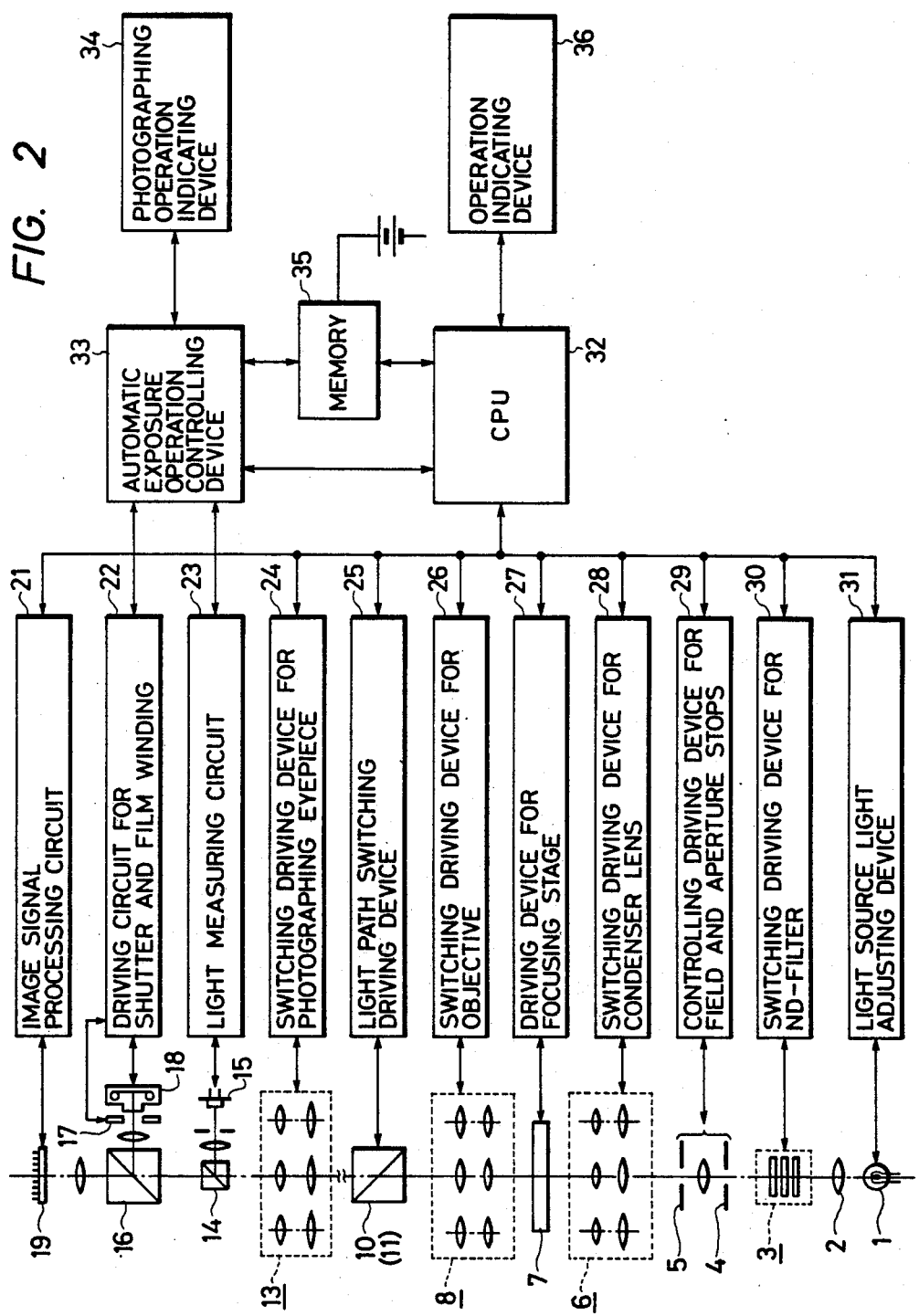
FIG. 2 is a block diagram of a control system according to the present invention for the microscope shown in FIG. 1.

In FIG. 2 showing a controlling system for the optical system shown in FIG. 1, the reference numeral 21 denotes an image signal processing circuit for controlling the drive of the image pickup device 19 for detecting focusing and processing its output signal, 22 denotes a driving circuit for driving the shutter 17 in the case of photographing and for winding up the film of the camera 18, 23 denotes a light measuring circuit capable of directly measuring the light with the output from the light receiving element, 24 denotes a switching driving device for bringing any of the photographing eyepieces 13a, 13b and 13c into the light path, 25 denotes a light path switching driving device for inserting and removing the beam splitters 10 and 11 in and from the light path, 26 denotes a switching driving device for bringing any of the objectives 8a, 8b and 8c into the light path, 27 denotes a driving device for vertically moving the focusing stage 7, 28 denotes a switching driving device for bringing any of the condenser lenses 6a, 6b and 6c into the light path, 29 denotes a controlling driving device for adjusting the opening degrees of the aperture stop 5 and field stop 4, 30 denotes a switching driving device for switching the ND-filter 3 to be brought into the light path and 31 denotes a light source light adjusting device for adjusting the light of the light source 1. The above described respective driving devices 24 to 30 are so formed as to be able to detect the switched states or controlled states simultaneously with their operations. The reference numeral 32 denotes a CPU including a sequence controlling unit and an arithmetic unit, 33 denotes an automatic exposure operation controlling device including a microcomputer, 34 denotes a photographing operation indicating device including the indication of film data required for photographing or such various operating buttons as a release, and 35 denotes a memory unit for memorizing the data relating to the objectives 8a, 8b and 8c, data relating to the film and projected image data to be used for automatic focusing and it is backed up by a battery. The reference numeral 36 denotes an operation indicating device including an operating switch required to individually move the above mentioned respective driving devices, operating switch button required for automatic focusing and operating switch button required to set the data relating to the objectives.

The operation of the above mentioned system shall be explained as follows. First of all, when an electric source is put in, a signal relating to any of the objectives 8a, 8b and 8c which has already been inserted into the light path from the objective switching driving device 26 will be input to the CPU 32 and whereby, the data relating to the magnification and kind (numerical aperture) of said objective stored in advance will be read out of the memory unit 35 are of the condenser lenses 6a, 6b, 6c most adapted to the said objective inserted in the light path will be selected out of these data, and the thus selected condenser lens will be inserted into the light path through the condenser lens switching driving device 28. At the same time, the proper opening values of the aperture stop 5 and field stop 4 will be calculated in CPU 32 and the stop diameter will be set through the stop controlling driving device 29. Further, by the CPU 32, the light amount of the light source 1 and the combination of the ND-filters 3 to be inserted into the light path will be selected on the basis of the data read out relating to the objective and the brightness of the observed visual field will be so set as to be a predetermined standard brightness through the light source light adjusting device 31 and ND-filter switching driving device 30. Thus, when the electric source is put in, the illuminating light will be able to be automatically set in a standard state. Also, when the objective and photographing eyepiece are switched by operating the operating switch button provided in the operation indicating device 36 or manually, such switching information will be put into the CPU 32 and the ND-filter 3, field stop 4, aperture stop 5 and condenser lens will be automatically set again the same as in the above mentioned case so as to obtain the above mentioned standard brightness of the visual field. Further, as the film data (such as ASA value) of the camera are stored in advance in the memory unit 35, as soon as the electric source is put in, the data of the film prepared to use will be read out of the memory unit 35, the optimum shutter speed will be calculated in the automatic exposure operation controlling device 33, the above mentioned film data and shutter speed will be indicated in the photographing operation indicating device 34 and, at the same time, the optimum exposure condition will be determined. On the other hand, when the image signal is put into the CPU 32 from the image pickup device 19 for detecting focusing, by the CPU 32, the various data of the objective located in the light path will be read out of the memory unit 35, the in-focus state will be operated and judged from said image signal on the basis of those data, the focusing stage 7 will be moved through the driving device 27 and thus the automatic focusing will be performed.

The above is the outline of the formation and operation of the microscope according to the present invention. An embodiment of the system according to the present invention shall be more particularly explained in the following.

Figure 3:
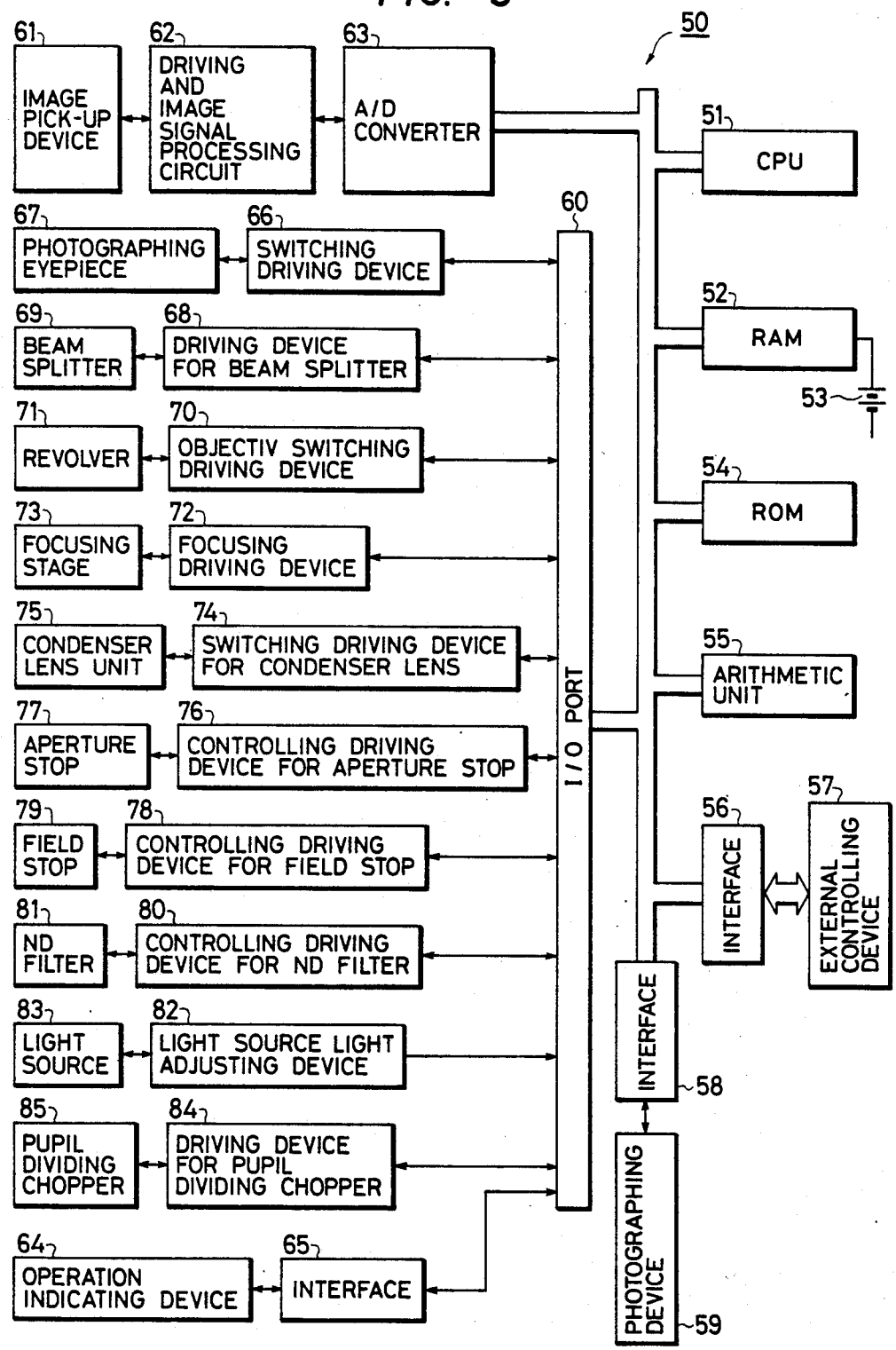
FIG. 3 is a detailed block diagram showing an embodiment of the controlling device of the microscope according to the present invention.
Figures 4, 5:
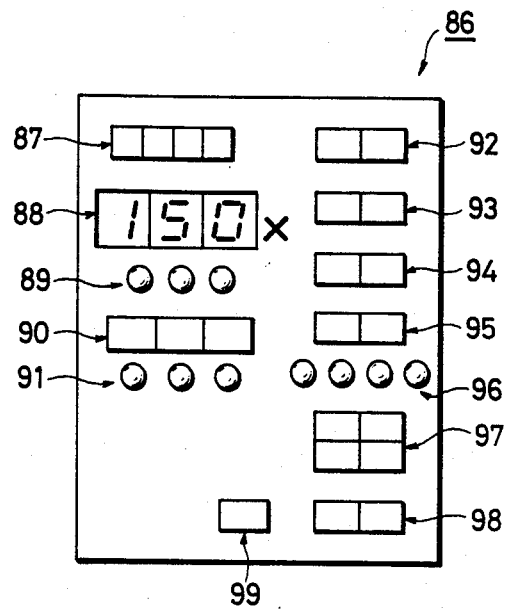
FIG. 4 is an elevational view showing an example of an operating panel in the controlling device in FIG. 3.
FIG. 5 is a table showing a data table of objectives.

In FIG. 3 showing a microscope controlling device 50 according to the present invention, the reference numeral 51 denotes a CPU, 52 denotes a RAM backed up by a battery 53 when the electric source is interrupted, 54 denotes a ROM as a program memory, 55 denotes an arithmetic unit used to improve the precision of the operation and to reduce the operation time, 56 denotes an interface for an external controlling device 57 used to control the controlling device 50 from outside, 58 denotes an interface for a photographing device 59, 60 denotes an I/O port for receiving and delivering the data and signals between later described various switching and controlling driving devices and the CPU 51, 61 denotes an image pickup device made by arranging in a row many image sensors for automatic focusing, 62 denotes a driving and image signal processing circuit for the image pickup device 61, 63 denotes an A/D converter, 64 denotes an operation indicating device including an operating switch button and indicator and used to put the input and output signals of the data relating to the objectives 8a, 8b and 8c and the switching signals to the respective driving devices and the like into and out of the I/O port 60 through the interface 65, 66 denotes a driving device for switching the photographing eyepiece 67, and 68 denotes a driving device for a beam splitter 69 capable of switching the light path to the observing system and photographing system and it can simultaneously detect which of the light paths is selected to use and put out the detecting signal to the CPU 51. The reference numeral 70 denotes an objective switching driving device used to bring any of the objectives 8a, 8b and 8c into the light path by rotating a revolver 71 and it can simultaneously detect the position of the revolver 71, that is, which of the objectives is inserted in the light path. The reference numeral 72 denotes a focusing driving device used for focusing by vertically moving a focusing stage 73, 74 denotes a switching driving device for switching a condenser lens unit 75 in response to the magnification of the objective inserted in the light path, 76 denotes a controlling driving device for controlling the stop diameter of an aperture stop 77, 78 denotes a controlling driving device for controlling the stop diameter of a field stop 79, 80 denotes an ND-filter switching driving device for adjusting the passing light amount ratio by switching an ND-filter unit 81 used to adjust the light, 82 denotes a light source light adjusting device for adjusting the light of a light source 83 and 84 denotes a driving device for a pupil dividing chopper 85 used for automatic focusing. In FIG. 4 showing an example of the operation indicating device 64, the reference numeral 86 denotes an operating panel, 87 denotes a switch button for putting in the magnifications and kinds (such as SPLAN, SPLAN APO and DPLAN) of the respective objectives 8a, 8b and 8c, 88 denotes a magnification indicator for the objective inserted in the light path (or selected to be used). 89 denotes a kind indicator for the objective inserted in the light path, 90 denotes a switch button for switching the light path to the observing system or the photographing optical system, 91 denotes an indicator for showing the kind of the light path switched to the using state, 92 and 93 denote switching buttons for manually adjusting respectively the field stop 79 and aperture stop 77 to be of proper stop diameters, 94 denotes a switch button for adjusting the light, 95 denotes a switch button for switching the magnification of the photographing eyepiece 67, 96 denotes an indicator for indicating the magnification of the photographing eyepiece inserted in the light path, 97 denotes a switch button for driving the stage 73 through the focusing driving device 72, 98 denotes a starting switch for rotating the revolver 71, and 99 denotes a starting switch for starting the automatic focusing operation.

The operation of the above mentioned device shall be explained in the following. First of all, setting the data of the objectives and the action relating to it shall be explained.

Figure 8:
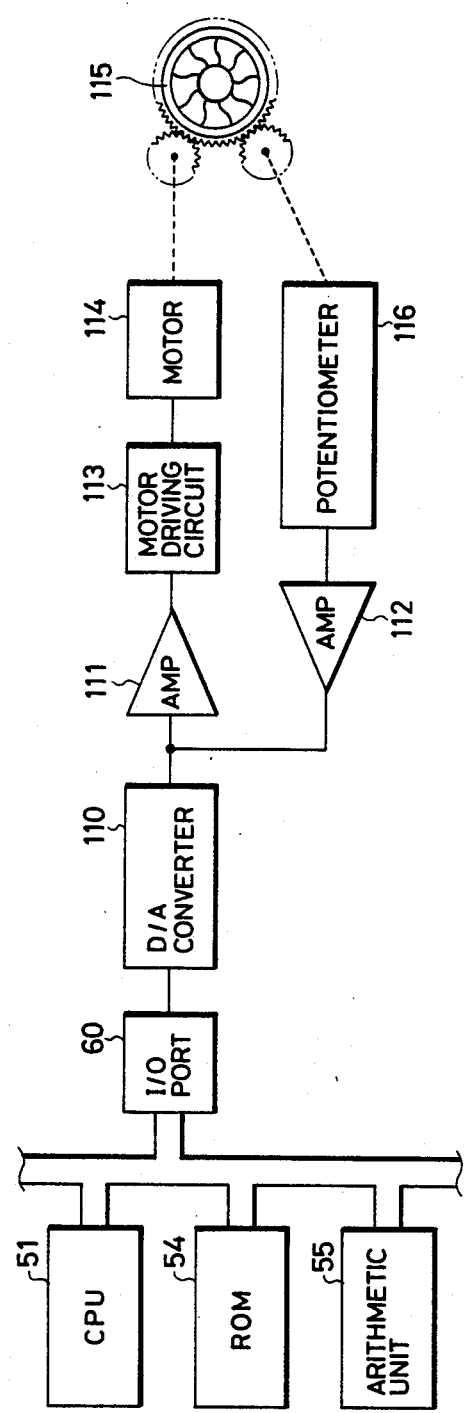
FIG. 8 is a block diagram of a stop controlling system.

Now, the case that the objective SPLAN of 10× is inserted in the light path shall be explained as an example. When the button designating a magnification of 10× and the kind SPLAN among the switch buttons 87 is pushed on the operating panel 86, this information will be put into the CPU 51 through the interface 65 and I/O port 60. On the other hand, by the CPU 51, the position of the revolver will be read out of the objective switching driving device 70, a data table 100 (FIG. 5) on the objective SPLAN of 10× will be made of the position and the information put in from the operating panel 86 and will be memorized by the RAM 52. This data table 100 will contain the position data of the revolver 71 and the data of the magnification and kind of the objective corresponding to them. In the case of FIG. 5, the data table 100 containing six revolver position data and the data of the magnifications and kinds of the respective objectives corresponding to them will be made. By the CPU 51, the following operation and control will be performed by always mornitoring this data table 100. That is to say, by the CPU 51, the magnification of the condenser lens 75 adapted to the objective inserted in the light path will be determined from the table in FIG. 6 in which combinations are theoretically determined in advance with reference to the table 100, a switching signal will be put out to the condenser lens switching driving device 74 and switching to a proper condenser lens will be performed. In the embodiment, the condenser lens 75 can be switched in three steps in response to the magnification of the objective. Then, in order to further set the observing condition, the stop diameters of the field stop 79 and aperture stop 77 will be respectively determined as mentioned below according to the data table 100. First of all, how to determine the stop diameter of the field stop 79 shall be explained. The stop diameter $d_1$ of the field stop 79 is calculated on the basis of the following formula:

$$d_1 = \frac{FNo. \text{ (Field number)}}{\text{Objective magnification} \times FS \text{ projection magnification}} \times K1 \quad (1)$$

wherein FNo. (Field number) is determined by whether the light path is switched to the observing system (Bi) or is switched to the photographing system (FK). as shown in the table in FIG. 7 or will be further determined by the magnification of the photographing eyepiece 67 when the light path is switched to the photographing system, also the FS projection magnification is determined by the magnification of the condenser lens 75 as shown in the table in FIG. 6, K1 is a ratio to the visual field, if K1=1, the value calculated by the formula (1) will give the stop aperture in external contact with the visual field, in this embodiment, when the data of the objective are set and when the electric source is put in, the stop diameter $d_1$ of the field stop 79 will be determined with K1=1 and therefore, even if the light path is switched to the observing system or to the photographing system, the field stop will be always set by the formula (1) so as to be a stop aperture in external contact with the visual field. Now, the stop diameter $d_2$ of the aperture stop 77 is calculated by the following formula:

$$d_2 = NA \times 2 \times f \times K2$$

wherein NA is a value determined by the magnification and kind of the objective as shown in the table in FIG. 6, f is a focal distance of the condenser lens 75 determined likewise from the table in FIG. 6, K2 is a ratio to the pupil diameter, if K2=1, the value $d_2$ obtained from the formula (2) will give the same stop diameter as the pupil diameter, in this embodiment, when the data of the objective are set and when the electric source is put in, with K2=0.8, the stop diameter $d_2$ of the aperture stop 77 will be initially set to be of a size 80% pupil diameter of the eyepiece so as to be optimum at the time of observation. By the way, the tables in FIGS. 6 and 7 are memorized in advance in the ROM 54. Here, in case the objective is the SPLAN of 10× and the light path is switched to the observing system, the respective stop diameters $d_1$ and $d_2$ to be automatically set will be calculated as follows. FNo.=28 and the FS projection magnification=0.133 will be obtained from the tables in FIGS. 6 and 7, if K1=1, from the formula (1)

$$d_1 = \frac{28}{10 \times 0.133} \times 1 \approx 21.1 \text{ (mm)},$$

in the same manner, from the table in FIG. 6, NA=0.3 and f=12 will be obtained and, if K2=0.8, from the formula (2), $$d_2 = 0.3 \times 2 \times 12 \times 0.8 \approx 5.8 \text{ (mm)}$$

will be obtained. The above calculation is performed by the CPU 51 and arithmetic unit 55. By the calculation result, the field stop 79 and aperture stop 77 are set to be stops having the above mentioned stop diameters $d_1$ and $d_2$ through the field stop controlling driving device 78 and aperture stop controlling driving device 76. In FIG. 8 showing an example of a controlling driving device for the field stop 79 or aperture stop 77, the reference numeral 110 denote a D/A converter, 111 and 112 denote amplifiers, 113 denotes a motor driving circuit, 114 denotes a motor, 115 denotes a stop mechanism capable of being opened and closed by the motor 114 through gears and 116 denotes a potentiometer for detecting the operating position of the stop mechanism 115. Here, in the case of the digital conversion of 8 bits, if the adjustable range of the stop diameter calculated as described above is 0 to 34 mm, $$D/A \text{ data} = \text{Field stop diameter} \times 7.5 \quad (3)$$

$$\therefore D/A \text{ data} = \frac{FNo. \text{ (Field number)}}{\text{Objective magnification} \times FS \text{ projection magnification}} \times K1 \times 7.5$$

therefore, the resolving power will be 0.13 mm/bit, the data digital-converted to 8 bits will be put into the D/A converter 110 through the I/O port 60 from the CPU 51, will be here converted to an analogue signal, will be amplified by the amplifier 111 and will drive the motor 114 through the motor driving circuit 113, therefore the stop mechanism 115 will be operated and the stop diameter will be adjusted but, as its operating position is always monitored by the potentiometer 116 and is fed back to the amplifier 111 through the amplifier 112, the stop aperture will be able to be controlled to be of a predetermined stop diameter.

Now, the automatic setting operation to make the optimum brightness for the observation when the objective data are set shall be explained in the following.

Figure 9A:
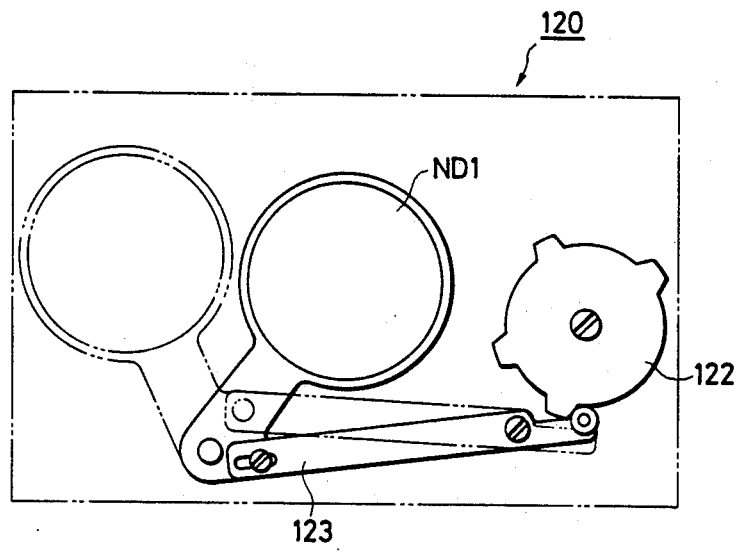
FIGS. 9A and 9B are respectively a plan view and side view showing an example of an ND-filter.
Figure 9B:
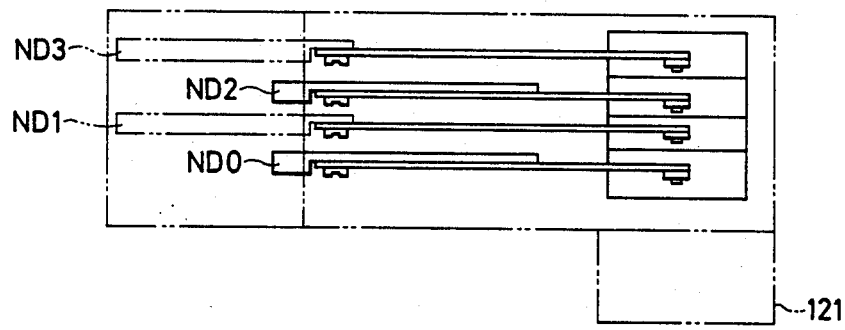

The illumination L on the image surface of the observing light is represented as follows:

$$L = LA \times ND \times AS \times Ob \times Bi \text{ (lx)} \qquad (4)$$

wherein ND is a light amount ratio given by the ND-filter unit 120 capable of changing the transmission factor by the combination of a plurality (here 4) of ND-filters ND0, ND1, ND2 and ND3 as shown, for example, in FIGS. 9A and 9B and will be controlled in 11 steps as shown in FIG. 10 when each ND-filter is selectively inserted into the light path through a lever 123 by a cam 122 driven by the motor 121, in FIGS. 9A and 9B, the ND0 and ND2 are inserted in the light path, from FIG. 10, the light amount ratio $ND = 1/16$ is given, AS is a brightness ratio of the aperture stop 77 and will be $0.82^2 = 0.64$ when the standard value is 80% pupil diameter, Bi is a light amount ratio when the light path of 100% Bi is made 1 as shown in FIG. 11, Ob is a light amount ratio with reference to the magnification and kind of the objective as shown in FIG. 12 and the light amount ratio Ob of the objective SPLAN of 10× is made 1 as a standard. LA is an illumination of the image surface in the light path of the objective SPLAN of 10×, light amount ratio $ND = 1$, brightness ratio $AS = 1$ and 100% Bi and, in this embodiments, $LA = 189$ lx is predetermined to be used as a constant. In this state, in order to always maintain the illumination of the image surface within the range of 0.5 to 1 lx, by the target value of $L = 0.5 \times \sqrt{2} \times 2^{\pm \frac{1}{2}} = 0.707 \times 2^{\pm \frac{1}{2}}$ (lx), from the formula (4), $$L = 189 \times 0.64 \times ND \times Ob \times Bi \qquad (5)$$
$$= 0.707 \times 2^{\pm \frac{1}{2}},$$

therefore, $ND = \dfrac{0.707}{189 \times 0.64 \times Ob \times Bi} = \dfrac{5.84 \times 10^{-3}}{Ob \times Bi}$ is obtained and the target value of the light amount ratio of the ND-filter is given. Now, as the ND-filter unit 120 is formed of a combination of four ND-filters, the target value of ND by the formula (5) must be given by the resolving power of $2^{\frac{1}{2}}$. Therefore, if a logarithm having $2^{\frac{1}{2}}$ at the bottom is taken in the formula (5).

$$\log_a ND = -30 - \log_a Ob - \log_a Bi \qquad (6)$$

will be made. Therefore, in order to determine an actual combination of ND-filters, $\log_a Ob$ is determined in response to the objective from the table in FIG. 12, also $\log_a Bi$ is determined from the table in FIG. 11 and $\log_a ND$ is obtained from the formula (5). Thus, the light amount ratio ND is obtained on the basis of the table shown in FIG. 13 in response to this $\log_a ND$ and such ND-filter as gives this light amount ratio is controlled by the ND-filter switching driving device 80 according to FIG. 10. By the way, the tables in FIGS. 10 to 13 are memorized in advance in the ROM 54 as data to be read out according to the need. Here, in the case of a light path of the objective SPLAN of 10× and observing system of 20% Bi, from the tables in FIGS. 11 and 12, $\log_a Bi = -9$ and $\log_a Ob = 0$ will be obtained from the formula (6), $$\log_n ND = -30 - 0 - (-9) = -21$$

will be obtained, from the table in FIG. 13, $ND = 1/32$ will be obtained and, according to the table in FIG. 10, if the ND-filters ND0 and ND3 are inserted into the light path, a proper brightness will be obtained. Therefore, when the CPU 51 puts out a signal to the ND-filter switching driving device 80 to insert the ND-filters ND0 and ND3 into the light path, the brightness of the observing system will be able to be set at a predetermined optimum value.

Thus, there are performed a series of related operations at the time of setting the data of the objective. In the case of setting the data of a plurality of objectives, the above mentioned operation will be effected on each objective. Also, the once set data of the objectives will be memorized in the RAM 52 together with the positions of the revolver 71 as the data table 100 in FIG. 5 and, as the RAM 52 is backed up by the battery 53 even when the electric source is interrupted, the data may be set only once at first. Further, as the data table 100 is memorized in the RAM 52, for example, if the revolver 71 is switched, the revolver position will be detected by the switching driving device 70, the magnification and kind of the objective will be read out by the data table 100 and, by the CPU 51, an optimum combination of the condenser lens 75, stop diameters of the field stop 79 and aperture stop 77 and ND-filter unit 81 will be automatically determined by operating as described above or referring to the data of the table memorized in the ROM 54 and signals will be put out to the respective driving devices to automatically set the elements of the illuminating optical system. By the way, not only at the time of switching the objective but also in the case of switching the light path of the observing system (Bi) and switching the photographing eyepiece 67, the above mentioned automatic setting will be performed exactly the same and therefore the observer will be released from the complicated operation of the microscope and will be able to make detection without any operation mistake.

Figure 14:
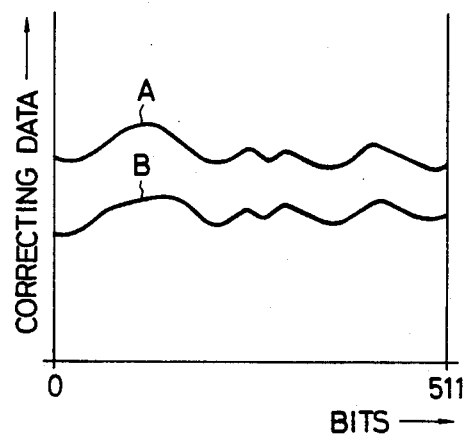
FIGS. 14 and 15 are graphs showing respectively correcting data and correction coefficients of images projected on the image pickup device.
Figure 15:
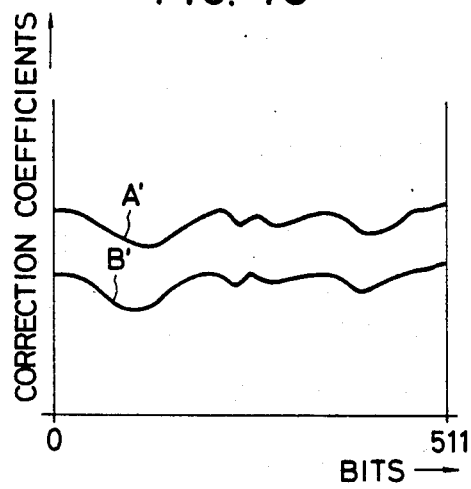

After the data are set and the related operations are performed as in the above, background data of the optical system for automatic focusing will be put in to correct the unevenness of the illumination of the image projected onto the image pickup device 61, the irregularity of the optical system and the noise pattern existing naturally in the image pickup device 61 under the state in which no sample is placed on the focusing stage 73. Further, in the input sequence of this correcting data, the data of the ND-filter unit 81, field stop 79 and aperture stop 77 will be so set as to be put in as optimum projected image data by the data table 100 memorized in the RAM 52. The two projected image data A and B divided by the pupil dividing chopper 85 will be obtained as in FIG. 14 by the image pickup device 61 and will be used as correcting data. Here, the x-axis represents bits of the image pickup device 61 and the y-axis represents output signals, that is, light amounts of the respective bits. When the correction coefficients of the respective bits are determined on the basis of these data, the correction coefficients A' and B' for the correcting data A and B will be respectively represented as in FIG. 15. When the correction coefficients A' and B' are put into the RAM 52 and are compared with the data table 100, the correction coefficients on the respective objectives will be memorized in turn in the RAM 52. In the case of automatic focusing, when image data are put in the CPU 51 from the image pickup device 61, the image data will be calculated with the correction coefficients to improve the precision of the image data. After this correcting data input sequence, the ND-filter 81, field stop 79 and aperture stop 77 will be set at the above described values so determined as to respectively show the best conditions for the observation.

Figure 16:
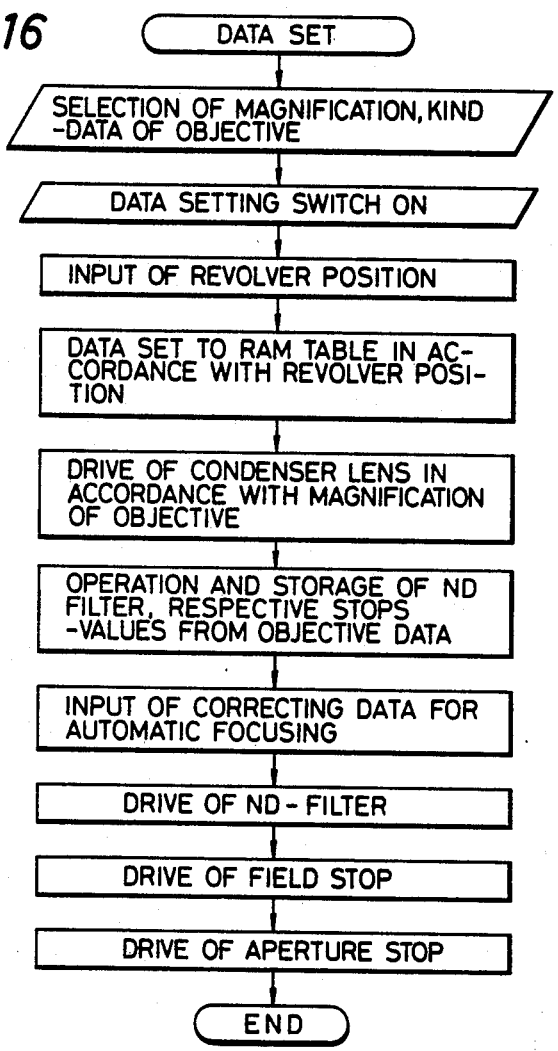
FIG. 16 is a flow chart of the control when the objective data are set.

The objective data are set and the operations relating to them are performed as in the above. Summarizing them is as shown in the flow chart in FIG. 16.

Figure 17:
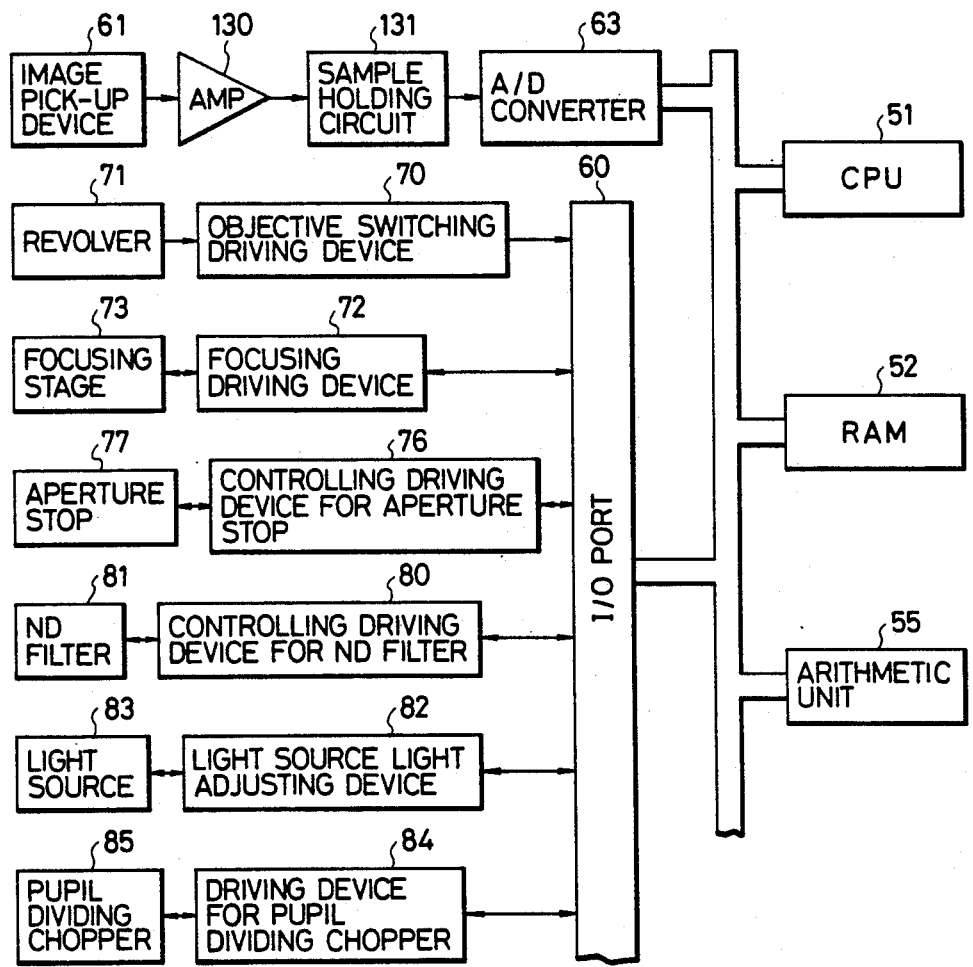
FIG. 17 is a block diagram showing another embodiment of the controlling device for automatic focusing.
Figure 18A:
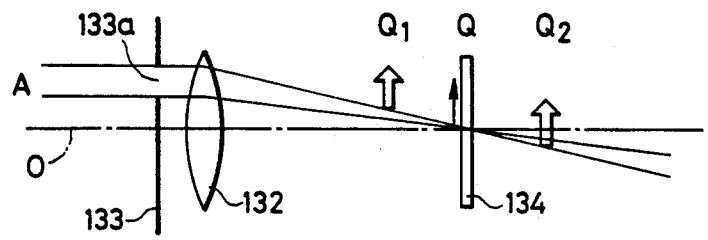
FIGS. 18A and 18B are schematic views showing the principle of focusing by dividing a pupil.
Figure 18B:
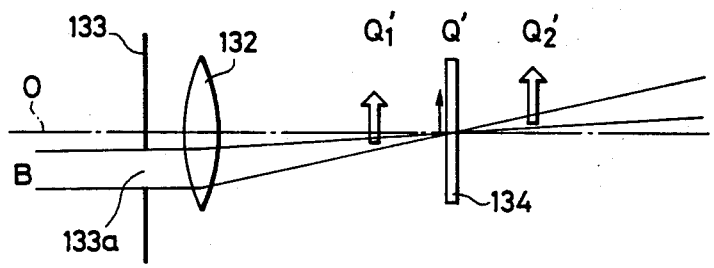
Figure 19A:
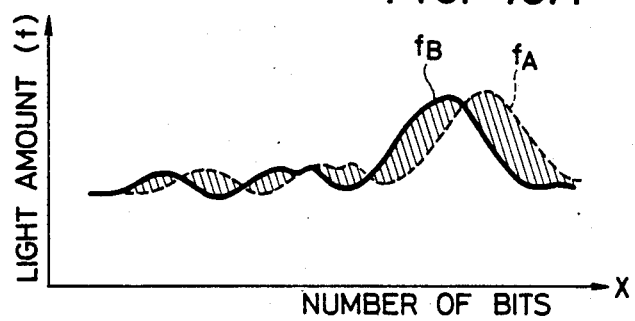
FIGS. 19A and 19B are graphs showing respectively the image data by the pupil division and the phase differences by the correlative operation.
Figure 19B:
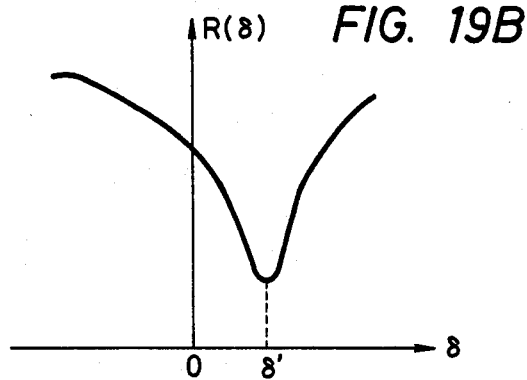
Figures 20A, 20B, 20C:
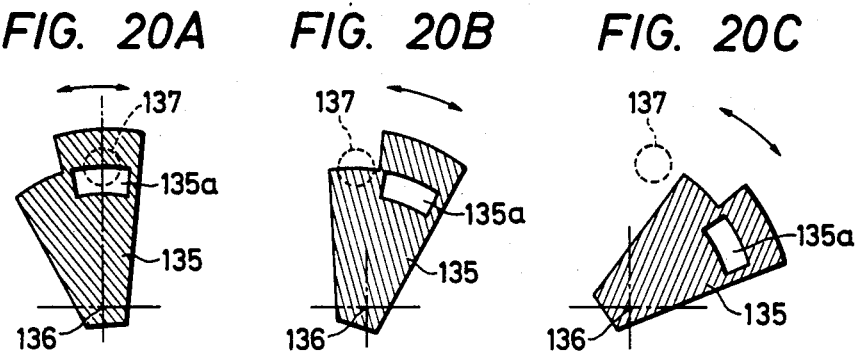
FIGS. 20A, 20B and 20C are explanatory views showing the respective operating positions of an embodiment of a pupil dividing chopper.
Figure 21:
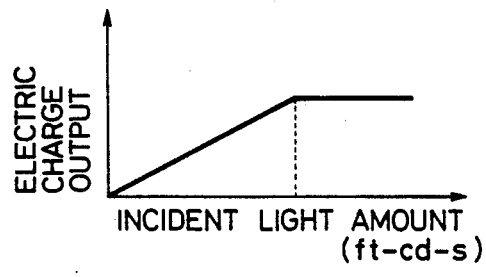
FIG. 21 is a graph showing outputs of the image pickup device.

Automatic focusing shall be explained in the following. In FIG. 17 which is a block diagram of a controlling circuit part for automatic focusing, the reference numeral 130 denotes an amplifier and 131 denotes a sample holding circuit. An image signal for an image projected onto the image pickup device 61 will be amplified by the amplifier 130, will be converted from a picture element information signal of 512 bits to a digital signal by the A/D converter 63 through the sample holding circuit 131, will be put into the CPU 51 and then will be memorized in the RAM 52. In this case, the image signal will be calculated by the arithmetic unit 55 with the correction coefficient (corresponding to the objective detected by the objective switching driving device 70) memorized in advance in the RAM 52 as described above and then will be memorized in the RAM 52. Further, when the pupil dividing chopper 85 arranged near the pupil position of the optical system is driven through the chopper driving device 84, the light bundle passing through the pupil position will be divided alternately into parts A and B as shown in FIGS. 18A and 18B, therefore the operation for in-focus computation will be performed by the arithmetic unit 55 on the basis of the image signal from the image pickup device 61 by the light bundle parts A and B, as a result of the calculation, the movement of the stage 73 will be determined and will be put into the CPU 51 and thereby the CPU 51 will drive the focusing stage 73 to the in-focus position through the focusing stage driving device 72. By the way, here the optical principle of focusing by dividing the pupil shall be explained. In FIGS. 18A and 18B, the reference numeral 132 denotes an image forming lens, 133 denotes a light intercepting plate as the pupil dividing chopper 85 having an aperture 133a arranged near the pupil in front of an image forming lens 132 and 134 denotes an image surface. In case the aperture 133a of the light intercepting plate 133 is in the position in FIG. 18A, when in focus, an image Q will be formed on the image surface 134 but, when out of focus, obscure images $Q_1$ and $Q_2$ will be formed in the positions on the image surface 134 displaced in the direction vertical to the optical axis O with respect to the image Q. In case the aperture 133a of the light intercepting plate 133 is in the position in FIG. 18B, when in focus, an image Q' will be formed on the image surface 134 but, when out of focus, obscure images $Q_1'$ and $Q_2'$ will be likewise formed. Thus, when the aperture 133a of the light intercepting plate 133 is rotated from the position in FIG. 18A to the position in FIG. 18B or vice versa, the images Q and Q' of when in focus will not move at all but the images of when out of focus will move from from $Q_1$ to $Q_1'$ or vice versa or from $Q_2$ to $Q_2'$ or vice versa as a result. Therefore, when the image pickup device 61 is arranged on the image surface 134 and the movement of the image is detected, whether in focus or not, whether the focal point is before or behind the image surface when out of focus and the distance between the position of focal point and the image surface in such case will be able to be known. On the basis of this principle, the image signals relating to the two projected images divided by the pupil dividing chopper 85 will be shown respectively by $f_A$ and $f_B$ in FIG. 19A. When a correlative calculation in which $f_B$ is shifted by δ with respect to $f_A$ is performed by $$R(\delta) = \sum_{x=n_1}^{n_2} ABS\{f_A(x) - f_B(x + \delta)\} \quad (7)$$

from $f_A$ and $f_B$, δ' (See FIG. 19B) giving the minimum value of R(δ) will be a phase difference between the two projected images in this case. Here, ABS {α} represents an absolute value of α. By the way, the area of the part shown by the hatching in FIG. 19A will be represented by R(0) where δ=0 in the formula (7). Thus, automatic focusing will be performed by controlling this δ' to be 0. In FIG. 20 showing an embodiment of the pupil dividing chopper 85, the reference numeral 135 denotes a chopper arranged rotatably around a rotary axis 136. In the position in FIG. 20A, only the light bundle passing through the lower half of the pupil 137 will pass through an aperture 135a to reach the image pickup device 61. In the position in FIG. 20B, only the light bundle passing through the upper half of the pupil 137 will pass through the outside of the chopper 135 to reach the image pickup device 61. Thus, the light bundle passing through the pupil part can be divided. In case the light bundle is not divided, the entire chopper will be retreated outside the pupil 137 as shown in FIG. 20C. Further, in case the later described contrast value is to be determined, the chopper 135 may be set in the position in FIGS. 20A or 20B. In this embodiment, it is set in the position in FIG. 20A. Further, the image pickup device 61 is formed of a photodiode array consisting, for example, of 512 photodiodes operated by an electric charge accumulating mode and its output signal is proportional to the incident light amount (ft−Cd) x repeated scanning time (in seconds) as shown in FIG. 21. By the way, as this output signal has a saturation point, when, so as to give a proper light amount to the image pickup device 61, on the basis of the data table 100 relating to the objective, the CPU 51 controls the light adjusting circuit 82 for the light source 83 and the ND-filter unit switching driving device 80 and gives information of a proper repeated scanning time to the image pickup device driving and image signal processing circuit 62, the output signal will be able to be set at an optimum electric charge accumulating time.

Figure 22:
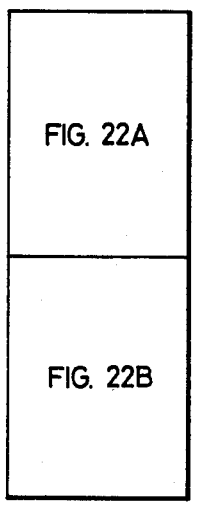
Figure 22A:
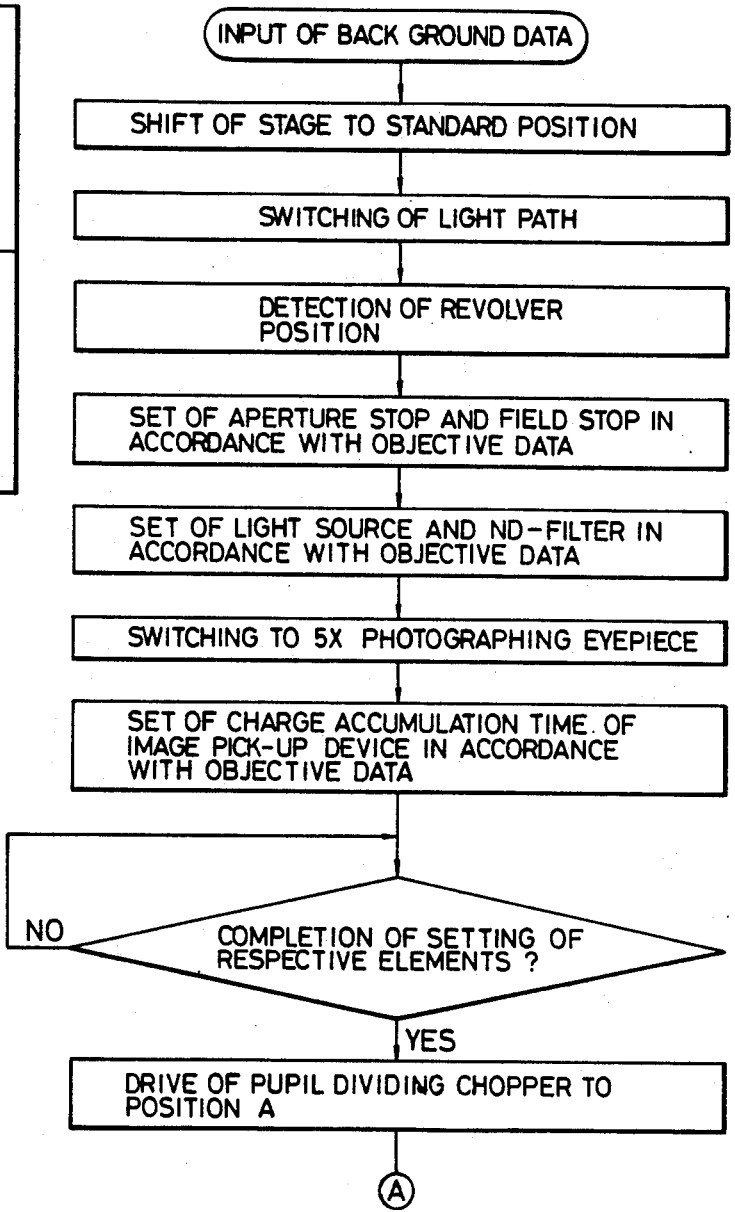

Here, the background data input briefly described in the explanation of the automatic control of the illuminating optical system shall be more detailedly explained with reference to the flow chart in FIG. 22.

Figure 23:
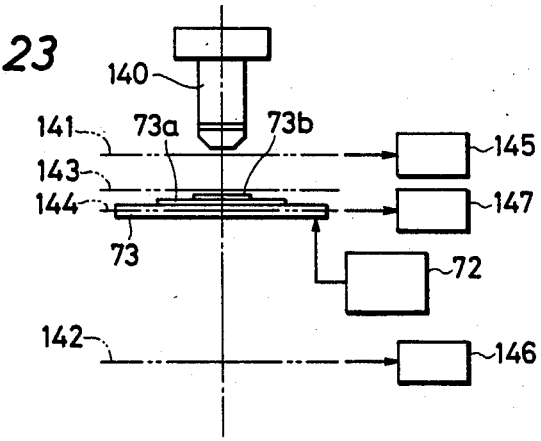
FIG. 23 is a view showing the standard position of the stage.

When the data of the objective inserted in the light path are put in by the operating panel 64, so that a combination of the condenser lens most adapted to that objective, stop diameters and ND-filters may be obtained, the condenser unit 75, aperture stop 77, field stop 79 and ND-filter 81 will be switched and controlled and, at the same time, the input sequence of the background data will be started. First of all, the stage 73 will be brought to the standard position set below the theoretical focus position by the focusing stage driving device 72. This standard position is set as in the following. In FIG. 23, the reference numeral 140 denotes an objective, 141 denotes an upper limit position of the stage 73, 142 denotes a lower limit position of the stage 73, 143 denotes a theoretical focus position, 144 denotes a standard position located by the presupposable maximum thickness of the slide glass 73a and usual cover glass 73b below the focus position 143 and 145, 146 and 147 denote such position sensors as photosensors for detecting respectively the positions 141, 142 and 144. Therefore, when the detection is performed by the position sensor 147, if the stage driving device 72 is stopped, the stage 73 will be stopped in the standard position 144 and, even if the thickness of the cover glass 73b and slide glass 73a fluctuates, the position of the stage 73 to give the actual focus position will be always above the standard position 144. When the stage 73 is brought to the upper limit position 141 or lower limit position 142, the sensor 145 or 146 will detect it and stop the focusing driving device 72 and, in the case of automatic focusing, preferably simultaneously out-of-focus will be able to be indicated. Thus, as soon as the stage 73 is brought to the standard position 144, the beam splitter 16 (FIGS. 1 and 2) will be switched to form a light path to the image pickup device 16. Also, on the basis of the objective data, the aperture stop 77 and field stop 79 will be adjusted to be of optimum stop diameters by the respective controlling driving devices 76 and 78 and further the light adjusting device 82 for the light source 83 and the switching driving device 80 for the ND-filter unit 81 will be controlled to obtain an optimum light amount for the image pickup device 61. At the same time, the driving device 66 will be controlled so as to insert the photographing eyepiece of a magnification of 5 times into the light path. By the way, the reason why the photographing eyepiece 67 to be inserted into the light path should has the magnification of 5 times is to coordinate the resolving power of the projected image to be formed on the image pickup device 61 and the resolving power of the image pickup device itself. The resolving power Δx of the photographing eyepiece is represented by $$\Delta x = \Delta Z \times NA = \frac{0.5\lambda}{NA}$$

where $= \frac{\lambda}{2NA^2}$ (focal depth).

In the case of the 5-times magnification system, if NA on the rear side of the objective is generally made 0.04, NA=0.008 on the image side of the 5-times magnification system. If λ≈0.5, then Δx=31.25 (μm). As the pitch of the arrangement of the respective sensors forming the image pickup device 61 used here is 28 μm, an image data resolving power sufficient for the projected image by the 5-times magnification system will be able to be obtained. Thus, after the photographing eyepiece 67 is switched to be of a magnification of 5 times, an electric charge accumulating time of the image pickup device adapted to effectively use the dynamic range of the image pickup device 61 will be calculated from the objective data and will be fed as control data to the driving and image signal processing circuit 62. After the CPU 51 confirms that the respective driving devices 66, 68, 74, 76, 78, 80 and 82 have operated in the respectively designated states, the pupil dividing chopper 85 will be driven to the first pupil dividing position (for example, the position in FIG. 20A) by the chopper driving device 84 and the image data from the image pickup device 61 at this time will be operated and processed by the CPU 51 and operating device 55 and will be memorized in the RAM 52 as correction coefficients of the respective bits. Then, the chopper 85 will be driven to the second pupil dividing position (for example, the position in FIG. 20B) and the correction coefficients at this time will be likewise memorized in the RAM 52. This can be done to each objective in case the objective is switched. Thus, after the correction coefficients are put into the RAM 52, the photographing eyepiece 67, light source 83, ND-filter unit 81, aperture stop 77, field stop 79 and beam splitter 16 will be returned to the initial positions or the states set before the background data input operation and the chopper 85 will be expelled out of the light path (to be in the position shown in FIG. 20C). When the background data input sequence is carried out as in the above, the image data of the sample image obtained in the case of automatic focusing to be made hereafter will be calculated and processed by the correction coefficients memorized as background data and automatic focusing of a higher precision will become possible.

Figure 25:
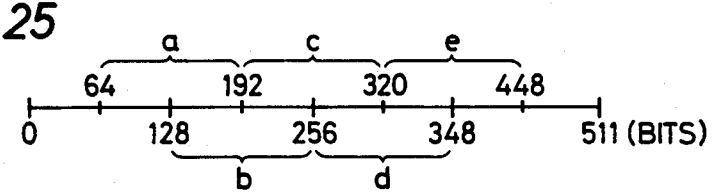
FIG. 25 is an explanatory view for explaining a method of obtaining a contrast of projected image data.

Now, the automatic focusing operation in the case of the objective SPLAN of 10× shall be explained with reference to the flow chart in FIG. 24. STEP (1). First of all, the conditions of the optical system for automatic focusing are set. When the switch button 99 on the operating panel 86 is pushed, by the CPU 51, whatever light path may be selected at that time, the states of the respective beam splitters will be memorized in the RAM 52 and the beam splitter 16 (FIG. 1) will be driven by the light path switching driving device to form a light path to the image pickup device 61. STEP (2) Also, the stop values of the aperture stop 77 and field stop 79, the switched state of the ND-filter unit 81 and the adjusted light state of the light source 83 then will be respectively memorized in the RAM 52 and, as done in the case of the background data input, the aperture stop 77, field stop 79, ND-filter unit 81 and light source 83 will be respectively so set that the projected image on the image pick up device 61 may be optimum. That is to say, according to the objective inserted in the light path on the basis of the objective data table 100, the stop diameter of the aperture stop 77 so as to be a stop diameter (of 100% on the pupil diameter) obtained when K2=1 in the formula (2), the stop diameter of the field stop 79 so as to be a stop diameter (in external contact with the visual field) obtained when K1=1 in the formula (1) and the ND-filter unit 81 and light source 83 so as to be of such value in which the coefficient of 0.707 in $$L = 0.707 \times 2^{\pm \frac{1}{2}}$$

of the image surface illumination obtained from the formula (4) is made 1 will be respectively calculated by the CPU 51 and arithmetic unit 55 and set by the respective driving devices and light adjusting circuit. STEP (3) Further, in order to elevate the resolving power of the projected image for the image pickup device 61, the photographing eyepiece 67 will be switched to be of a magnification of 5 times. STEP (4) After the above setting, when the CPU 51 confirms it, STEP (5) the pupil dividing chopper 85 will be moved to the first pupil dividing position (FIG. 20A) by the chopper driving device 84 and, at the same time, STEP (6) the position of the stage 73 will be detected. STEP (7) When the stage 73 is above the standard position 144, STEP (8) the image data in the first pupil dividing position will be put into the CPU 51 from the image pickup device 61 and, by the CPU 51, these image data will be calculated and processed with the correction coefficients memorized as the background data in the RAM 52 to obtain $f_A$, this will be memorized in the RAM 52 and STEP (9) the contrast value will be calculated. Here, the contrast value will be calculated as follows, for example, by FIG. 25. If the sensor of 512 bits form the image pickup device 61 is divided into five sections a, b, c, d and e, $f(x)$ is made the x th bit signal and x is calculated at intervals of 4 bits, the contrast C will be represented by $$C = \sum_x |f(x) - f(x + 5)|, (x = 4n) \quad (8)$$

This will be to calculate the absolute value of the difference of the signals of the sensors in the positions separated respectively by 5 bits. Therefore, the contrast Ca of the section a will be $$Ca = \sum_x^{184} |f(x) - f(x + 5)|, (x = 4n)$$
$$= |f(64) - f(69)| + |f(68) - f(73)| + \ldots + |f(184) - f(189)|.$$

In the same manner, the contrasts of the respective sections will be calculated to obtain the entire contrast value. STEP (10) When the thus obtained contrast value is below a preset threshold value and in case the stage 73 is below the standard position 144, STEP (11) the stage 73 will be moved to the standard position 144 by the stage driving device 72, STEP (12) again the image data in the first pupil dividing position will be calculated and processed and will be memorized in the RAM 52 and STEP (13) the contrast value will be calculated. STEP (14) Here, if the contrast value is below the threshold value, STEP (15) the stage 73 will be moved upward by 100 μm (which is changed in response to the focal depth of the objective to be used). STEPS (16 and 17) After it is confirmed that the position at that time of the stage 73 is not the upper limit position 141, STEP (12) the image data in the first pupil position will be again calculated and processed and will be memorized in the RAM 52, the contrast value will be calculated and this operation will be repeated until the contrast value becomes higher than the threshold value but, when the stage 73 reaches the upper limit position 141 in the course, STEP (18) it will be detected by the sensor 145, thereby the above mentioned operation will be interrupted and further out-of-focus will be indicated on the operation indicating device 64. STEP (10) When the contrast value is higher than the threshold value, STEP (19) the pupil dividing chopper 85 will be moved to the second pupil dividing position (FIG. 20B) by the chopper driving device 84 and the image data in that position will be put into the CPU 51 from the image pickup device 61 and, by the CPU 51 and arithmetic unit 55, these image data will be calculated and processed with the correction coefficients memorized as background data in the RAM 52 to obtain $f_B$, $f_A$ previously memorized in the RAM 52 will be read out, STEP (20) the correlative calculation shown in the formula (7) will be performed by the arithmetic unit 55 to determine δ (phase difference) giving the minimum value of R(δ) and the amount and direction of the movement of the stage 73 will be determined on the basis of this phase difference δ' and STEP (21) the stage 73 will be moved by the stage driving device 72. However, when the stage 73 reaches to the upper or lower limit positions by the calculation result, the operation will be interrupted and out-of-focus will be indicated. STEP (22) Then the pupil dividing chopper 85 will be again driven, the image data $f_A$ and $f_B$ respectively in the first pupil dividing position and second pupil dividing position will be calculated to determine δ' giving the minimum value of R(δ) by STEP (23) the correlative calculation and the correlative calculation will be repeated until δ' becomes 0. STEP (24) When δ' becomes 0, infocus will be indicated on the operation indicating device 64. STEP (25) After in-focus or out-of-focus is thus indicated on the operation indicating device, on the basis of the data memorized in the RAM 52 at the beginning of the automatic focusing operation, STEPS (26, 27 and 28) the respective optical system devices will be returned to the states as of before the automatic focusing. That is to say, the pupil dividing chopper 85 will be retreated out of the light path (FIG. 20C), the photographing eyepiece 67 will be switched to be of the initial magnification and the aperture stop 77, field stop 79, ND-filter unit and light source 83 will be respectively returned to the initial controlled and switched states. Further, the beam splitter 16 will be inserted into the light path to form the light path of the photographing system. Thus the automatic focusing operation will be completed.

I claim:

1. A microscope which includes a field stop, an aperture stop, means for producing a light, a plurality of condenser lens means for condensing the light emitted from said light producing means source and capable of being selectively inserted into a light path, a focusing stage, a revolver, and a plurality of objectives with magnifications different from each another attached to the revolver, and which is provided with an automatic focusing device, comprising:

data input means for inputting data relating to the magnification and kinds of the objectives;

memory means, connected to said data input means, for memorizing said data relating to a plurality of objectives input by said data input means;

first driving controlling means coupled to said memory means, for controlling at least one of adjustment of the light producing means, field stop, aperture stop, switching of a condenser lens, movement of a stage, and switching of a light path, while referring to data read out relating to a selected objective, which is selected to be used, so as to be able to perform optimum focusing for said selected objective;

image pickup means, receiving a projected image formed by said selected objective, for focusing said image, second driving controlling means, connected to said image pickup means and said memory means for driving said image pickup means, and a central processing unit, coupled to said second driving controlling means.

2. A microscope according to claim 1, in which said image pickup means is a CCD element including a plurality of picture elements, and wherein said second driving controlling means includes clock driving control means for driving said CCD element to provide an optimum output for the use of a dynamic range in the amount of light.

3. A microscope according to claim 1 further comprising operating means for performing manual adjustment for an illuminating condition by at least one of said field stop, aperture stop and switching of the condenser lens in accordance with a preference of an observer, to correct the illuminating condition on a sample determined as automatic optimum values, and means for memorizing the result of the adjustment by correcting coefficients to the automatic optimum values already determined, the illuminating condition being returned to a manually adjusted condition after the focusing has been completed.

4. A microscope according to claim 3, in which said correcting coefficients are used as they are even when the objective selected to be used is changed, in order to enable manual correction of an illuminating condition of the microscope using other objectives.

5. A microscope according to claim 3 further comprising means for returning said correcting coefficients to a standard value.

6. A microscope according to claim 3 further comprising sensor means for detecting positions of said stage which are different from each other, a standard position of said stage being set apart by a predetermined a distance from a theoretical in-focus position of the objective in a direction of departing from said objective, the stage being moved to said standard position when operating instructions for automatically focusing are issued by said central processing unit judging by comparison between the stage position value and the standard position value, and when said stage is in a position departing from said standard position in the direction of departing from said objective, an operation for focusing being carried out when said stage reaches said standard position, and said operation being repeated while moving stepwise said stage by a predetermined distance until an in-focus state is obtained.

7. A microscope according to claim 6, in which said operation for focusing to be performed on the basis of said image data is carried out on the basis of a calculated contrast value in the first stage and is carried out on the basis of a correlating calculation in the second stage wherein a predetermined contrast value has be obtained.

8. A microscope according to claim 6, in which the predetermined distance of said stage to be moved on the basis of said operation for focusing corresponds to a focal depth of an objective selected to use.

9. A microscope according to claim 6, in which an upper limit position and lower limit position are provided within a range of the movement of said stage so as to sandwich said standard position therebetween, and at least one of said stage and an indicating device is controlled when said upper limit position or lower limit position is detected by said sensors.

10. A microscope according to claim 1 further comprising a plurality of photographing eyepieces inserted selectively in the light path, each photographing eyepiece having a predetermined magnification being capable of being inserted into the light path to increase the resolving power of a sample image to be projected on said image pickup device when an automatically focusing is to be performed.

11. A microscope according to claim 1 wherein said first driving controlling means controls the adjustment of the light producing means, field stop, aperture stop, the switching of the condenser lens and the like while referring to said data read out on the objective selected for at least one of observation and photographing.

12. A microscope according to claim 1 further comprising correcting means for correcting a resulting unevenness of illumination on said image pickup means, which unevenness results from optical strain due to the optical system through the illuminating sytstem to the image pickup device, and from interelement characteristics of the image pickup device itself.

13. A microscope according to claim 1 in which said correcting means comprises program execution means for preparing correction data and said memory means for memorizing the output value of said program execution means with respect to each objective before a sample is observed by the microscope, and is also for correcting an output for focusing through the objective corresponding to the memorized value when the sample is to be observed by the microscope.

* * * * *